Figure 10:
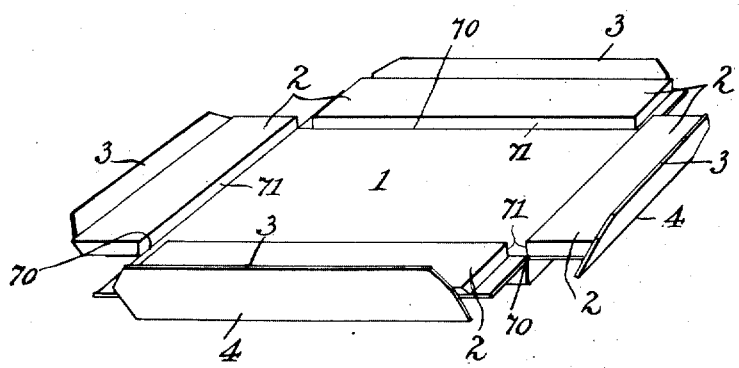

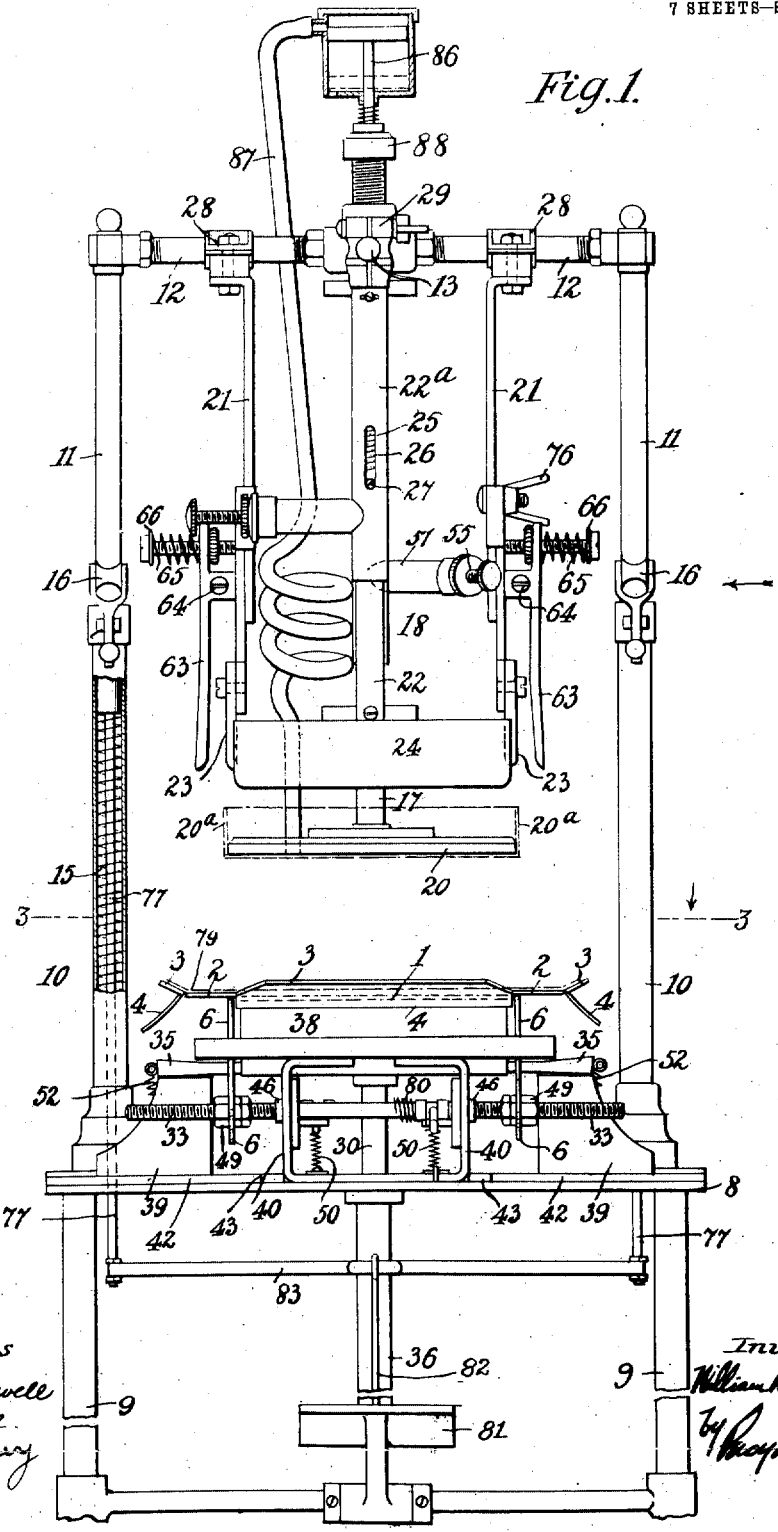

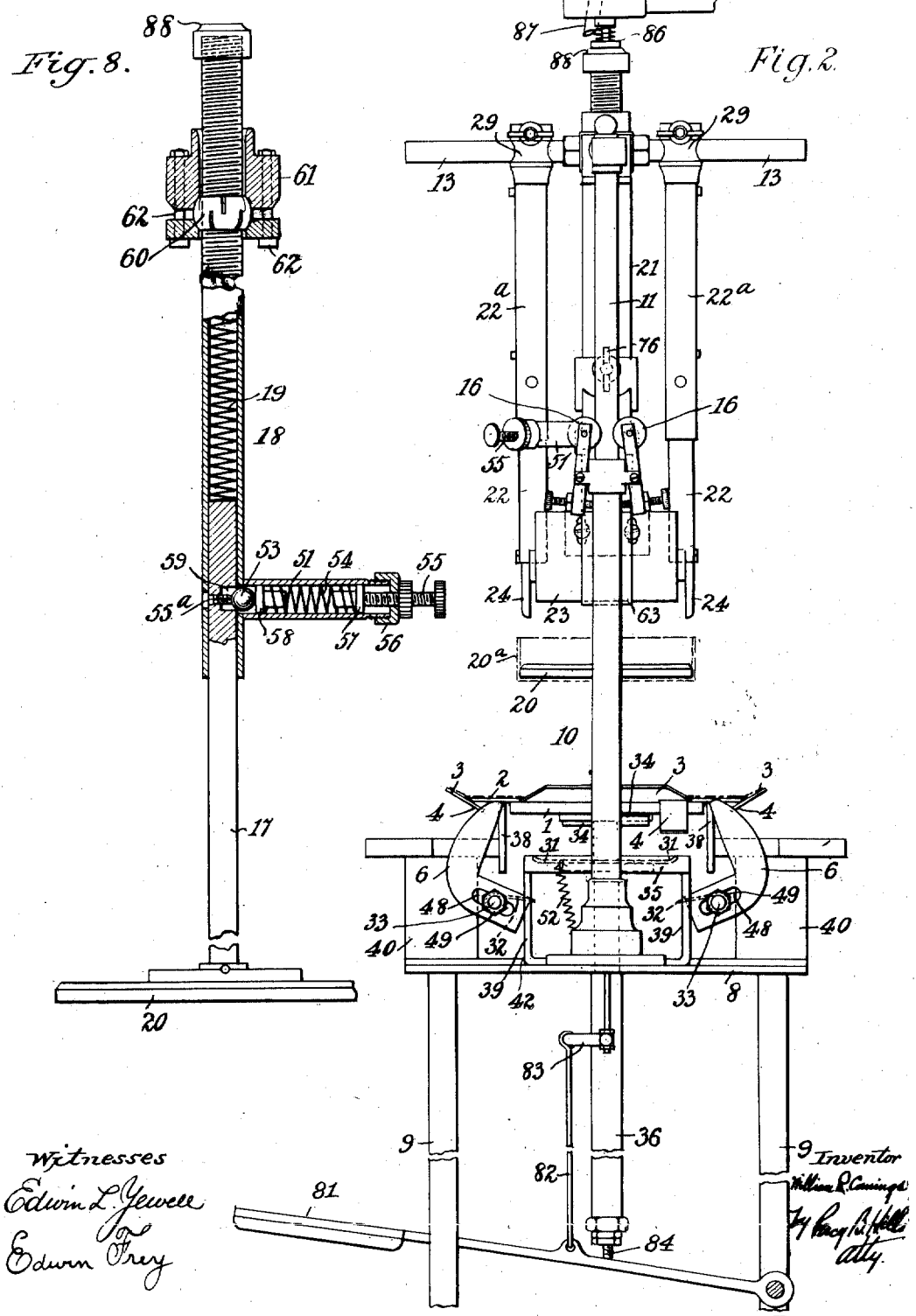

W. R. COMINGS.
BOX MAKING MACHINE.
APPLICATION FILED JULY 9, 1906.
1,000,991.
Patented Aug. 22, 1911.
7 SHEETS—SHEET 3.
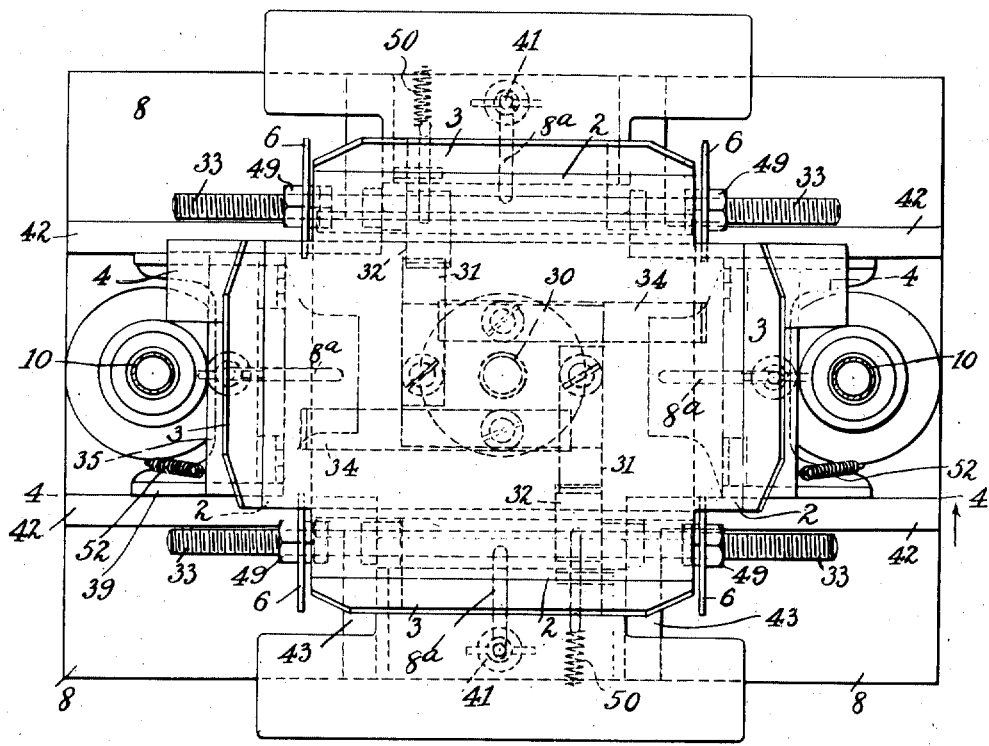
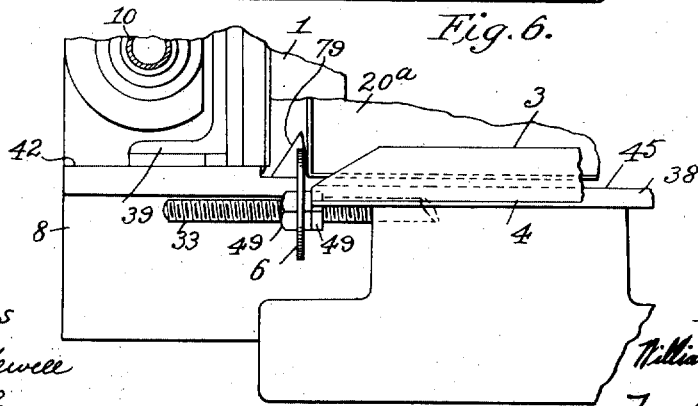

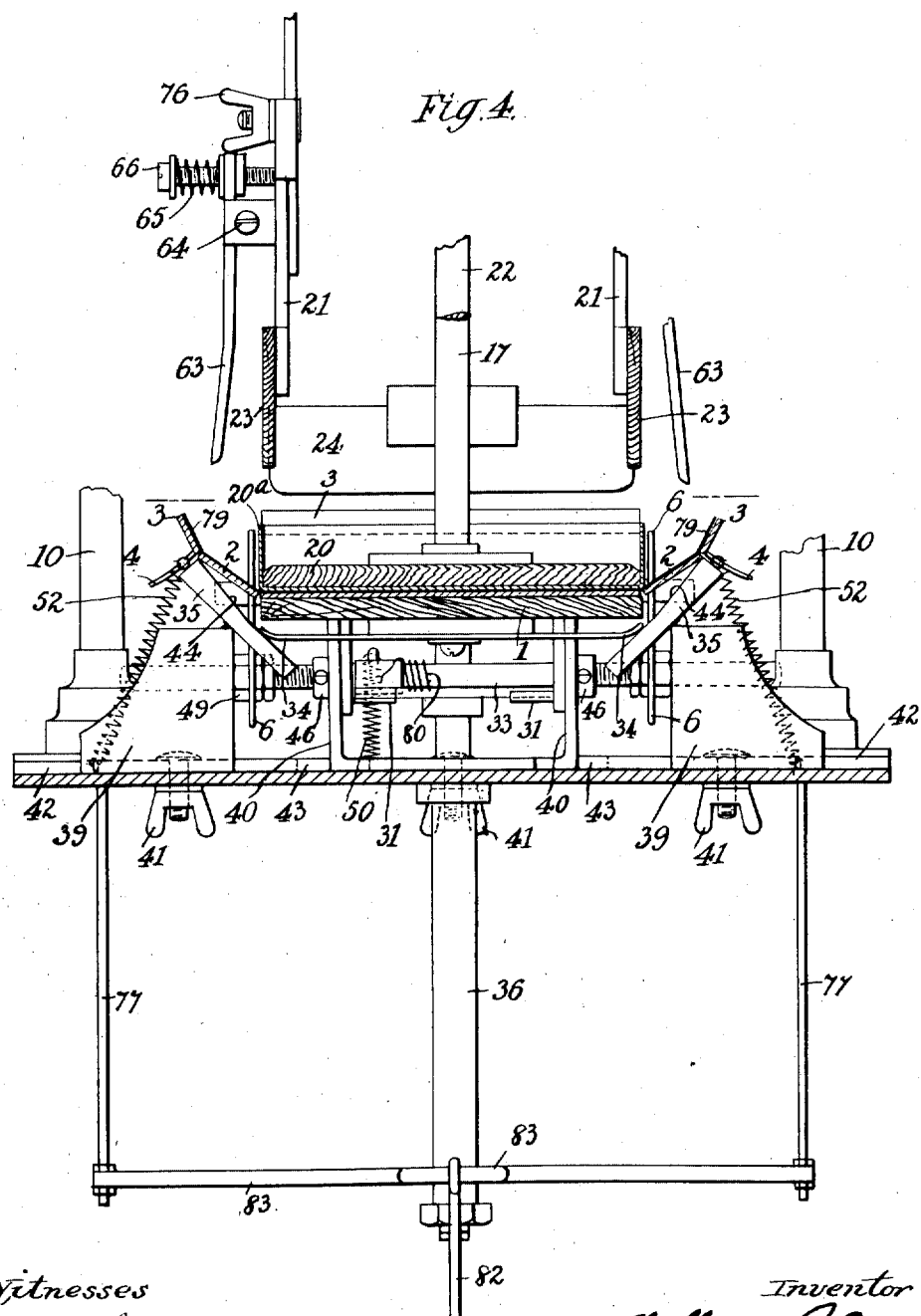

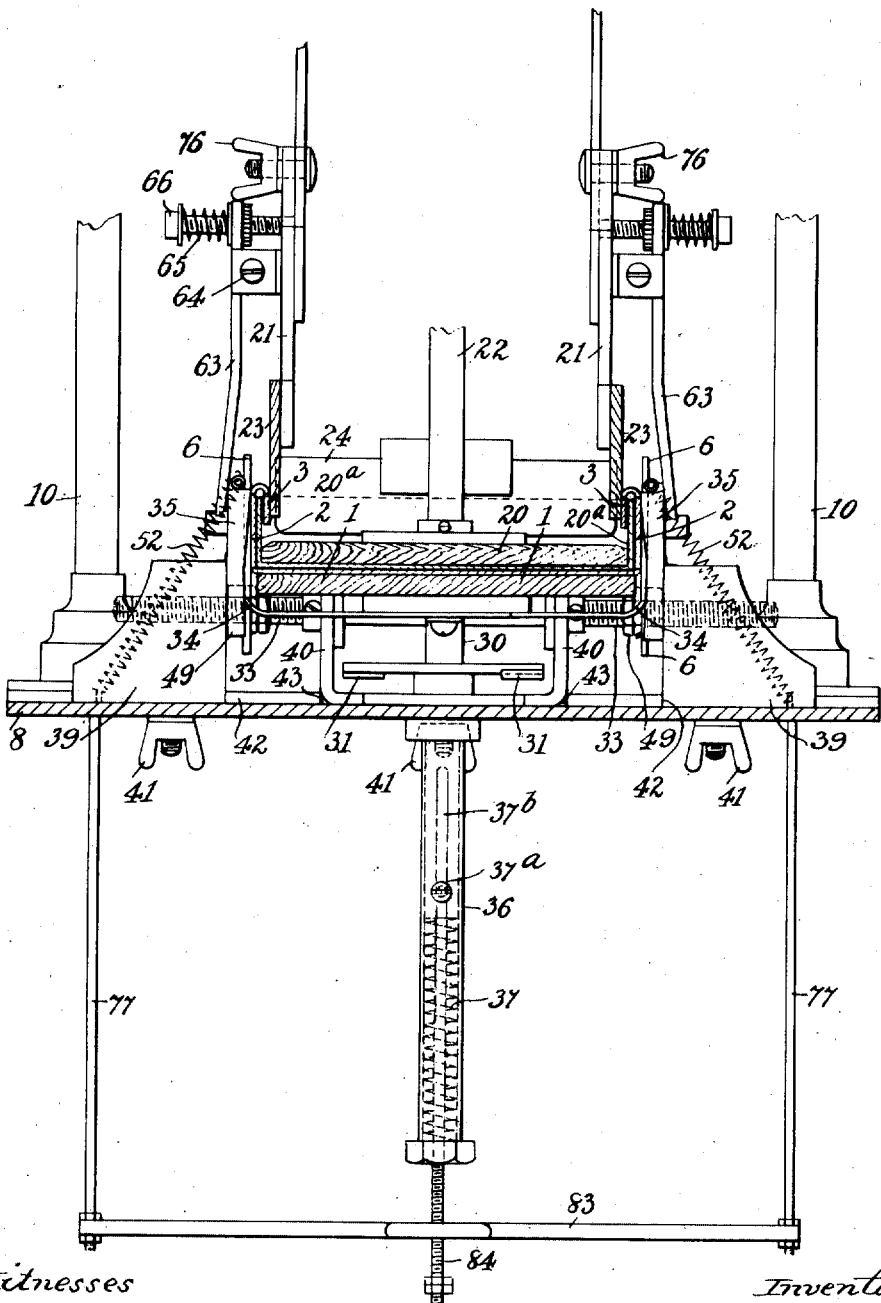

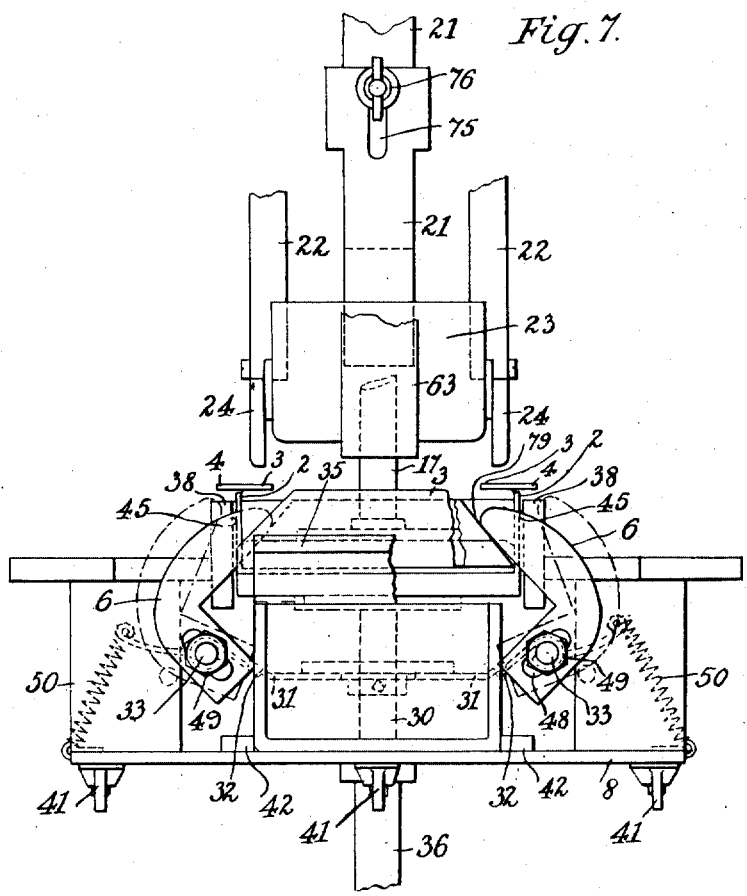
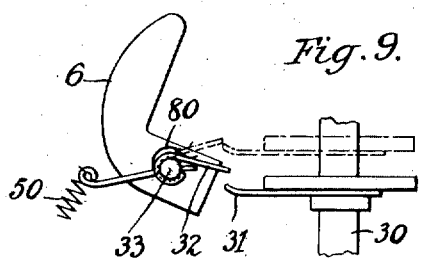

W. R. COMINGS.
BOX MAKING MACHINE.
APPLICATION FILED JULY 9, 1906.

1,000,991.

Patented Aug. 22, 1911.
7 SHEETS—SHEET 7.

Witnesses
Edwin L. Yewell
Edwin Frey

Inventor
William R. Comings
by Percy B. Hills
Atty

UNITED STATES PATENT OFFICE.

WILLIAM RIGHTER COMINGS, OF LONDON, ENGLAND.

BOX-MAKING MACHINE.

1,000,991.   Specification of Letters Patent.   Patented Aug. 22, 1911.

Application filed July 9, 1906. Serial No. 325,424.

*To all whom it may concern:*

Be it known that I, WILLIAM RIGHTER COMINGS, a citizen of the United States, residing at London, in the county of Surrey, England, have invented new and useful Improvements in Box-Making Machines, of which the following is a specification.

My invention relates to the manufacture of boxes, and is designed either to manufacture the box or lid itself, or to cover a previously made box or lid.

Said invention is primarily designed to manufacture or cover cardboard or other paper boxes and lids, though the mechanism is applicable to the manufacture of boxes and lids of metal.

According to this invention, it is proposed to employ mechanism of substantially the following kind, the description being mainly devoted to the action when covering a previously made box or lid, and from this description the action of making a box only, or of making a box and covering it at the same time, will be readily understood.

A folding die or mechanism is provided having hinged or flexible wings adapted to fold the covering blank up into close fitting contact with the sides of the box, and afterward by its continued action turn the covering material, if desired, around the top edge of the box and fold it into the inside, and fix it there when required. The die working in this way may be termed a double acting folding die, or by suitable modification may also be made triple acting when it is desired to make or cover a flanged box. In the latter case the first action is to fold the covering blank over the flange and press it into the corner angle between the flange and the box body; the second action is, as before, to fold up the sides and corners; and the third action turns the flaps over the edges into the inside of the box. This folding die is operated by any suitable actuating mechanism in such a manner as to cause the three actions to follow on in sequence and may be completed during a single stroke or turn of the driving power, after which, during the return stroke, the die opens out and resumes its original position so that the completed or covered box can be removed or ejected from the die by any suitable mechanism.

When desired, the die can be adapted to fold up a single blank into the form of a plain or uncovered box, but its most common and useful function is to cover with plain or fancy materials a box body or blank that has been previously prepared by some other machine or by hand.

It is preferred to arrange the actuating mechanism of the die so that its several actions are, without intermission, sequences of one continuous motion, but these sections can also be worked in separate stages of intermittent motion where the requirements of special work render it advantageous.

Figure 11:
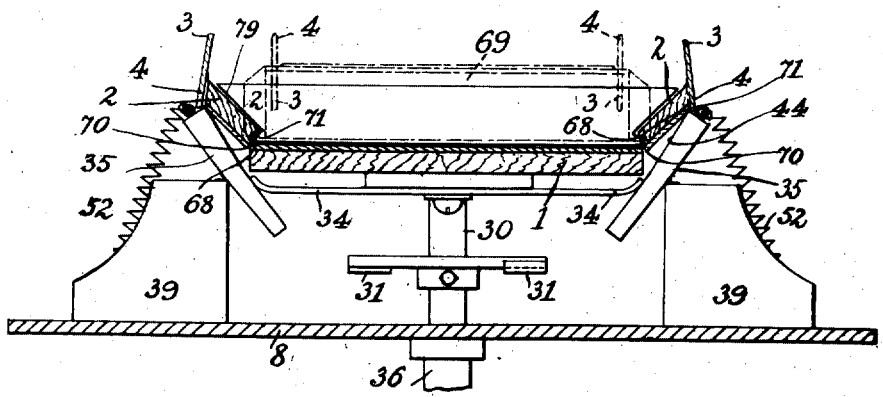

The accompanying drawings illustrate one convenient form in which the apparatus may be constructed, and in same: Figure 1 is a side elevation, partly in section, of the machine. Fig. 2 is an end elevation thereof. Fig. 3 is a horizontal section, taken on the line 3—3, Fig. 1, looking in the direction of the arrow. Fig. 4 is a vertical section, taken on the line 4—4, Fig. 3, looking in the direction of the arrow, and illustrating one step in the operation of the machine. Fig. 5 is a view similar to that shown in Fig. 4, illustrating the same operation at a later stage. Fig. 6 is a part plan, and Fig. 7 an elevation, on a larger scale, illustrating the corner folding or "tucking in" operation. Fig. 8 is a sectional view of a detailed part of the machine. Fig. 9 is a detail view, showing more clearly the means for operating the tucking in device. Figs. 10 and 11 are, respectively, a perspective view, and a part sectional side elevation, of a modification of part of the machine.

In the form of machine illustrated in the drawings the folding die consists of a base plate 1 having four primary wing pieces 2 hinged thereto along its edge and corresponding to the sides of the box to be formed or covered, and approximately equal in width to the depth of the box. To the top edges of these primary wings 2 are hinged secondary wings 3 similar in length to the primary wings 2, but not so wide.

The secondary wings 3 are provided with, or have fixed thereto, overlapping pieces or trip fins 4, which project or overlap beyond the hinged edges of the secondary wings sufficiently to act as intercepting or trip levers whenever the die is by suitable means forced through guide surfaces adapted to fold or close up the primary wings, and by such action of the trip fins or levers 4 the secondary wings 3 are turned down and automatically carry the flaps of the covering blank over inside the box, all of which will hereafter be more fully described.

In some cases the secondary wings 3 may be dispensed with, and only the primary wings 2 employed, the flaps of the covering blank being then turned in and fixed by hand.

The folding die is also utilized in connection with swinging tucking fingers 6, suitably placed near each corner of the folding die, and adapted, as the sides of the blank are folded up, to form corner folds of the surplus material and tuck them in behind the side folds just before these are completely turned up. The arrangement and operation of these tucking fingers will also be hereafter more fully described.

The folding die is preferably mounted in a suitable press, which, in the form shown in the drawings, comprises a table 8 having suitable supports 9 and carrying fixed upright hollow side members 10, which support and guide the movable side members 11, and cross arms 12 and 13 of a sliding frame which is normally held in its highest or most extended position by springs 15, in the present instance conveniently contained, as shown, in the hollow members 10, in which the members 11 of the frame are adapted to slide. Guide or friction rollers 16 may also be provided for the sliding members 11, as shown.

The sliding frame carries, supported by the cross arms 12, 13, a plunger 17 which is preferably telescopic by being slidable in a hollow member 18 fixed to the aforesaid cross arms 12, 13. The plunger 17 is normally held in its extended position by means of a coiled spring 19 (Fig. 8) within the hollow member 18 and whereby it has a yielding action, the amount of which is capable of adjustment, as will hereafter be shown. The plunger 17 is provided with a plate 20, adapted to receive and carry the box 20ª, shown in dotted lines in Figs. 1 and 2, into the folding die and force it through or between guiding surfaces, so as to fold up the primary wings 2. Also suitably and adjustably fixed to the cross arms 12, 13 of the slide, and outside the plunger 17, are two pairs of arms 21, 22, one pair being connected with the arms 12 and the other pair with the arms 13. These arms 21, 22, which may be termed presser arms, are arranged to co-act with, or, as shown, to carry bars or surfaces 23, 24, which co-act with the secondary wings 3 of the folding die and give them the final pressure required to finish the complete turning in of the covering blank. These presser arms 21, 22 may be constructed with side springs so as to exert a more or less elastic pressure upon the secondary wings when they are finishing their action or the pressure may be increased by having them co-act with wedging surfaces fixed upon the plunger.

In some cases it is preferred to make one pair of the presser arms or the removable bars carried thereby somewhat longer than the other, as shown in the case of the pair 22 attached to the cross arms 13, so as to assist in turning down two of the covering flaps in advance of the others, and which, when the flaps have adhesive applied, prevents them interfering and so avoids the spreading of the adhesive upon the finished face of the covering material. The two extended presser arms 22 thus lengthened are formed telescopic or sliding, the hollow member 22ª of each containing a coiled spring 25 and being slotted at 26 (Fig. 1) to regulate or provide for the desired length of travel of the telescoping member 22, which travel is limited by a stud or projection 27. By this arrangement, when the final pressure is exerted to complete the covering or like operation, the springs yield and allow all the arms to become the same length. These presser arms, when considered together, may conveniently be termed the second action of the machine, and in most cases it is preferred to employ the presser arms 21, 22, as described for the second action, and to attach them to the cross arms 12, 13, by means of clamps 28, 29, so that they may be readily adjusted for the purpose of giving pressure upon all four sides of the box, or for operating upon boxes of different sizes. The presser arms 21 may also, as shown in Fig. 7, be made adjustable in a vertical direction by providing them with slots 75 and clamping screws 76 whereby their height with respect to the presser arms 22 may be varied as desired. Both pairs of presser arms 21, 22 may further be provided at their lower ends with slots and screws, whereby the bars or surfaces 23, 24 are so secured that they may be adjusted, or removed and replaced by others adapted to fit different sized boxes.

The folding die is provided preferably with a stem or shaft 30, adapted to carry and support and guide it in its motion, and also to co-act with mechanism which actuates at the desired time the tucking fingers 6 that form and turn in the corner folds of the covering blanks, and further by its spring action, hereinafter described, it causes or assists the folding die to return to its normal position upon the upstroke of the sliding member, and at the same time it may eject the finished box. The return movement of the die stem may be assisted, as hereinafter described, by the contact of said stem, or an extension 84 thereof, with a foot treadle 81 by means of which the machine is operated. This die stem or shaft 30 carries on the under side of the die two fingers or projections 31 (Figs. 3, 7 and 9), adapted on the descent of the die and its stem 30 to engage with trip levers 32 carried upon rocking shafts 33, which shafts carry the tucking fingers 6 and impart motion to them, and this motion of the tucking fingers 6 can be modified and regulated at will, according to the character of the folds desired, as will be hereinafter shown.

On the under side of the die base plate 1, and supported from the die stem 30, are projecting fingers or cam acting surfaces 34 adapted to operate hinged closer jaws 35 when, as shown in the drawings, these latter are used, and said die stem 30 is adapted to telescope or slide in an outer hollow member 36, the latter being provided with a coiled spring 37 (Fig. 5) of sufficient strength to return said stem 30 to its normal or raised position, shown in Figs. 1 and 2, upon the ascent of the plunger 17. A stud 37ª projecting through a slot 37ᵇ in the hollow member 36 limits the travel of the die stem.

The pair of hinged closer jaws 35 are adapted to act in conjunction with a pair of fixed closer jaws 38, and both pairs 35 and 38 coact with and operate the folding die. The jaws 35 and 38 are mounted in brackets 39 and 40, respectively, adjustably secured by clamping screws 41 or the like, passing through slots 8ª (Fig. 3) in the table 8 of the machine, which brackets are slidable in slide ways 42, 43 and so placed that they surround and are parallel with the sides of the folding die and can be moved up and set just clear of its base plate 1, so that, when the die descends, its presser wings contact with the closer jaws and are caused to fold up thereby. Upon the return or upward movement of the folding die, the hinged closer jaws 35 are returned to their normal position by means of springs 52, or by equivalent means. These closers are, as stated, in pairs 35 and 38, and are operated in pairs, and, as shown in the drawings, are placed at different distances from the die, namely, the rigid set 38 being placed higher or nearer to the die than the hinged set 35. The effect of this arrangement is that in the covering operation two opposite sides of the box are always turned up and acted upon in advance of the other sides, which prevents the adhesive, when used, being squeezed out or smeared onto the inside of the box or finished surface of the material, and it also enables a much neater finish to be obtained upon the inside corners of the box.

The pair of hinged closer jaws 35 is so mounted as to have their acting surfaces 44 at an angle with the line of motion of the die, in the present example these surfaces 44 being practically horizontal, while the acting surfaces 45 of the rigid closer jaws 38 are, practically vertical. The result of this arrangement, and also of the positioning of the two pairs of jaws with respect to the die, is that the rigid jaws 38 act upon the corresponding side or primary wings 2 of the die, and fold them over before the hinged jaws 35 are turned up by the descending die and so turn their remaining pair of primary presser wings up into position.

Instead of combining a pair of hinged closer jaws with a pair of rigid jaws, both pairs may be either hinged or rigid, but the combined arrangement described is preferable.

The rocker shafts 33, carrying the tucking fingers 6, are mounted beneath the closer jaws above described in any suitable position to be acted upon by the motion of the die through the medium of the fingers 31, which are adjustably mounted, and the trip levers 32 before mentioned. In the machine illustrated a pair of rocker shafts is employed mounted in suitable bearings 46 carried by the brackets 40 of the rigid closer jaws 38. The rocker shafts are parallel with each other and with the rigid closer jaws 38, and the tucking fingers 6 are mounted thereon so that they may be adjusted as to length of throw, angle of throw, and radius of throw, which enables practically any variety of corner fold to be readily obtained, and further the distance between the tucking fingers can also be adjustably regulated so as to adapt them to any size of box within the capacity of the machine. These adjustments of the tucking fingers 6 are conveniently obtained by providing them with slots 48 through which the rocker shafts 33 pass, said slots being placed radially with respect to the rocker shafts, so that, as before stated, the angle, length and radius of the throw of the tucking fingers may be varied. The tucking fingers are tightened in the desired set position on the rocker shafts by means of adjusting nuts 49 adapted to ride upon threaded portions of the rocking shafts, so that by suitably positioning the nuts the distance between the tucking fingers may be varied.

The rocker shafts 33, as already stated, take their forward motion, to enable the tucking fingers to effect the tucking in operation, from the trip levers 32, and their quick return motion to withdraw said tucking fingers, after the corners are tucked in and before the final closing up of the ends or sides of the box or blank is completed, from springs 50 attached thereto and to the table 8 of the machine. The trip levers 32 are returned to their normal position by the return motion of the rocker shafts, after they are released from fingers 31 by the continued descent of the die stem 30, and said trip levers 32 are so mounted upon the rocker shafts that, while they are rigid with respect to said rocker shafts during the downward movement of the latter, they are free in the reverse direction, so that as the die and its stem rise the fingers 31 raise the trip levers 32 out of their way, and then release said levers, which are given a quick or escapement action by means of a spring 80, whereby they are caused to resume their original position to intercept the fingers 31 on the next downward movement of the die.

The plunger 17 and the telescoping presser arms 22 are permitted a yielding spring locking and releasing action, as already mentioned, and this spring action can be regulated, as regards the pressure required to cause it, by the following convenient device, as illustrated in Fig. 8, applied to the plunger.

The hollow member 18 of the plunger 17 is provided with a hollow branch 51 extending therefrom at a right angle and containing a loose hard metal ball 53 adapted to be projected into the path of the plunger 17 by the pressure of a spring 54 located behind said ball and in the branch 51. The pressure of the spring is regulated by means of a regulating screw 55 which passes through the cap 56 of the branch 51 and compresses the spring 54, through the medium of a loose plunger 57, a like loose plunger 58 being preferably interposed between the ball end of the spring 54 and the ball 53. The plunger 17 is provided with a slot 59, or groove, or the like, and the amount of pressure required to telescope the plunger is determined by the position of the ball 53 with respect to the slot, that is, the further the ball projects into engagement with the slot 59, the greater the pressure required to telescope the plunger. This regulation is effected in some degree by means of a second regulating screw 55ᵃ which is carried by the plunger 17 itself, and projects into the slot 59 and contacts with the ball 53. By these means the ball may be so positioned that the movement of the plunger will either push it easily out of the way against the pressure of the spring 54, and so offer but little resistance to the telescoping of the plunger, or the ball may be allowed to go so far into engagement with the slot 59 of the plunger that the telescopic movement of the latter is completely prevented. This arrangement provides an automatic locking and releasing action of the plunger 17. Said mechanism is, however, more particularly described and claimed in an application filed by me June 14, 1906, Serial No. 321,601, and forms no part of the invention sought to be claimed in this application.

It is essential that the die base plate 1 should be perfectly true with the plunger plate 20, and to this end either the one or the other is made capable of adjustment. In the present instance the plunger is made universally adjustable, as shown in Fig. 8, by providing it with a ball socket joint 60 at its point of support in the cross arms 12, 13 of the sliding frame, the ball 60 being split, as shown, and gripped by clamping pieces 61 adapted, when the necessary adjustment of the plunger plate has been made, to be tightened on the split ball 60 by screws 62. Instead of the plunger 17, the die stem 30 may be the adjustable member, by providing it, where it passes through the table 8 of the machine, with adjustable bearings. It is preferred, however, to employ the above described arrangement.

As before stated, some additional pressure may be given to the hinged closer jaws 35 to insure that they firmly press the secondary wings and the covering blank against the sides of the box, by providing the presser arms 21 with side plates consisting of enveloping pieces 63, hinged or movably attached thereto at 64 and having a more or less yielding action imparted to them by springs 65, which action is adjustable by the regulating screws 66, as shown in Fig. 1.

In covering or making up flanged boxes, the modified form of folding die shown in Figs. 10 and 11 is employed, and from which it will be seen that the primary wings 2 are made slightly thicker than the width of the flange 68 of the box or lid 69, and they are hinged to the base 1 of the die at 70, as shown, upon their outside edge so that as they are turned up their lower inside edges 71 gradually fold over the flange 68 and exert a pressure upon its whole surface, thus firmly gluing it down, if adhesive has previously been applied to the proper part of the box blank or covering blank. For this function of the machine, that is, covering the flanged lids, the lower edge 71 of the primary wings may be coated with an elastic material or pneumatic pad adapted to give yielding pressure. This form of die is provided with secondary wings 3 and trip fins 4 as before, which may also be provided with pneumatic or elastic pads, if desired, and such pads may be employed for other than flanged boxes. In making flanged boxes as above described it is preferred to employ blanks previously scored or creased.

The machine above described may be operated by hand, foot, or other power, a convenient arrangement being to extend the movable side members 11 so that they pass through the hollow side members 10 on the under side of the table 8, or are connected, as shown, to rods or extensions 77, which may be attached by connections 82, 83 to a foot treadle 81, the depression of which draws down slide and the plunger to which the box body or lid is attached.

The operation of the machine is as follows: The box body or lid 20ª is placed upon the plunger plate 20, as shown in dotted lines in Figs. 1 and 2, upon which it fits sufficiently tight to hold by friction. The covering blank 79 is then placed upon the folding die so that it is centered to properly register with the box body or lid. The sliding frame is next lowered by the depression of the foot treadle 81, or by other suitable means, causing the plunger 17 to descend, carrying with it the box body or lid 20ª, until it reaches the base plate 1 of the folding die. The continued motion of the plunger 17 then forces the folding die and its spring supported stem 30 first through the rigid closer jaws 38, which operate to fold up the corresponding pair of primary wings of the die 2, after which the tucking fingers 6 are brought into operation by the projections 31 engaging with the trip levers 32 of the rocker shafts 33 to tuck in the corners of the covering blank, as shown in Figs. 6 and 7, when, on the release and quick return of the trip levers 32 from the projections 31, by the further descent of the die stem 30, the rocker shafts and tucking in fingers are also returned to their normal positions, as shown in dotted lines in Fig. 7, by the action of the springs 50, and then through the continued downward motion of the plunger 17, the hinged closer jaws 35 (Fig. 4) are turned up vertically by the fingers 34 to fold up the remaining pair of primary wings, thus pressing the covering blank up against the sides of the box blank, as shown in Fig. 5. Following on the withdrawal of the tucking fingers 6 is the action of initially turning over the secondary wings 3, by the engagement of the trip fins 4 with the edges of the closer jaws 35, 38 to complete the covering operation by turning the edges of the blank over to the inside of the box body or lid, the bars or surfaces 23, 24 carried by presser arms 21, 22, which descend with the plunger, continuing their descent until they contact with and force the secondary wings 3 to the position shown in Fig. 5, thus forcing the covering blank on the inside of the box where it is caused to adhere firmly, if an adhesive has been used. The covering or folding operation being now completed, and the plunger having reached the lowest point of its travel with the parts in the respective positions shown in Fig. 5, the treadle 81 or the like is released, and the springs of the movable side members 11 return the side members and plunger to their original position (Figs. 1 and 2), the die stem 30 and the die following by reason of the spring 37, which may be augmented by the upward motion of the treadle 81 contacting with extension 84 thereof, while the springs 52 turn the hinged closer jaws also to their normal position, thus leaving the finished article ready for ejection from the machine. In order that the plunger 20 and the presser bars 24 may be automatically limited in their downward movement, independent of the pressure applied to the treadle 81, the spring locking and releasing mechanism, hereinbefore described, is employed. Thus by adjusting the balls 53 said mechanisms may be set to automatically release the plunger 20 and presser bars 24 at the moment that the box cover is fully applied, so that a further downward movement of the treadle 81 will not carry with it the said plunger and presser bars.

For the purpose of ejecting the finished article the plunger or "first action" may, if desired, have suitable ejector mechanism for removing the boxes when completed and carrying them through a chute into a convenient receptacle. This may be accomplished in several ways by mechanical strippers, but I prefer to do it by a pneumatic puff ejector, and one way of carrying this out is to fix in convenient juxtaposition to the machine a bellows or elastic bag, or, as shown, a pneumatic piston 86 communicating by a tube 87 with the under side of the plunger plate 20 carrying the box. Then, when the slide rises on its upward stroke under action of its spring, the cross head 88 thereof, as shown, comes into contact with the piston 86 and forces the air through the tube 87 in a quick puff underneath the box or lid, thus removing it from the pad, and the jet may be so directed as to carry the box away from the plunger in any convenient direction into any suitable chute.

In some cases the die can be worked without primary wings by having swinging closers which may have on their upper edge secondary wings with trip fins adapted to turn over the flap of the covering blank. For some kinds of work I can place the primary and secondary wings on the closers, thus forming the die of separate detached parts. The operation has been described as having only the flaps of the covering blank glued, but the machine will also work a fully glued covering blank, or one without any adhesive whatever, and, when desired, the machine can be arranged to work either by power or by hand and foot power.

In the operation of making a box or lid, as distinguished from covering a previously formed box or lid, it will be understood that the same is accomplished by placing upon the folding die a blank of suitable shape and of the proper thickness of material, whether paper or metal, whereupon the downward movement of the plunger will form the completed box or lid in a manner similar to that described in respect to the covering operation.

Having thus described my invention, what I claim as new and desire to secure by Letters Patent is:

1. In a box making machine, a plunger, a die, and means on said die operated by the movement of said plunger for completely folding a blank.

2. In a box making machine, a plunger, a movable die, and means on said die operated by the movement of the plunger and die for completely folding a blank.

3. In a box making machine, a plunger, a die, and means on said die operated by the movement of the plunger for completely folding a blank on said die during a single continuous operation of said plunger.

4. In a box making machine, a movable plunger, a movable die operated by the movement of said plunger, and means on said die operated by the movement of said die to completely fold a blank on said die.

5. In a box making machine, the combination with a plunger, of a movable blank receiving die, folding members thereon, and means operated by a movement of said plunger and die for folding said members on said die.

6. In a box making machine, the combination with a plunger, of a movable blank receiving die, pivotally arranged wings connected with said die, and means operated by a movement of the plunger and die for folding the die wings and blank.

7. In a box making machine, the combination with a vertically movable plunger, of a vertically movable die, wings pivoted to the sides of said die, and means operated by the movement of said plunger and die during a continuous downward movement thereof for folding said wings upwardly.

8. In a box making machine, the combination with a vertically movable plunger, of a reciprocating die registering with and moved by said plunger in its downward movement and supported on the machine frame, wings pivotally secured to the sides of said die, and means on said frame operated by the movement of said plunger and die during a continuous downward movement thereof for engaging said wings to fold them upwardly.

9. In a box making machine, the combination with a vertically movable plunger, of a vertically movable die, a plurality of wings pivoted to said die, and means operated by the movement of said plunger and die for folding said wings into different positions upon the downward movement of said plunger and die.

10. In a box making machine, the combination with a plunger, of a die, primary wings pivotally secured to the sides of said die, means for folding said wings upwardly on the downward movement of said plunger, secondary wings pivoted to the said primary wings, and means for folding said wings inwardly when the primary wings reach their upward position and on the further downward movement of the said plunger.

11. In a box making machine, the combination with a movable plunger, a movable die operated by the movement of said plunger, and folding members on said die, of means operated by the movement of said die to fold said members on said die.

12. In a box making machine, the combination with a vertically movable plunger, of a folding die, means for moving and folding said die upon the downward movement of the plunger, and tucking fingers also operated by the downward movement of said plunger and die.

13. In a box making machine, the combination with a vertically movable plunger, of a vertically movable die, wings pivoted to the sides thereof, means for folding said wings upwardly on the downward movement of said plunger, tucking fingers also operated by the downward movement of said plunger and die, and means for moving said fingers into operative position after said wings have begun their folding movement and for retracting them before said wings complete their folding movement.

14. In a box making machine, the combination with a plunger, of a folding die adapted to be moved by said plunger, tucking fingers pivoted to the machine frame, and operating latches connected with said fingers and operated by said folding die on its downward movement to operate said fingers.

15. In a box making machine, the combination with a vertically movable plunger, of a downwardly movable folding die adapted to be moved by said plunger, tucking fingers pivoted to the machine frame, and operating latches connected with said fingers and lying in the path of said die to be operated thereby on the downward movement of the plunger, said latches yielding to the passage of said die on its return movement.

16. In a box making machine, the combination with a plunger, of a downwardly movable die, primary wings pivotally secured to the sides thereof, means for folding said wings upwardly on the downward movement of the plunger, secondary wings pivotally secured to the primary wings, means for folding said wings inwardly as said primary wings reach their upward position on the further downward movement of the plunger, tucking fingers pivoted to the frame of the machine, and operating latches connected therewith and operated by the die in its downward movement.

17. In a box making machine, the combination with a frame, and a vertically movable plunger operating within said frame, of a vertically movable folding die, a stem supporting said die, a spring support for said stem in said frame, and means on said frame for folding said die on all sides by the downward movement of said plunger and die.

18. In a box making machine, the combination with a frame, and a vertically movable plunger operating within said frame, of a vertically movable die having a stem rigidly secured to its lower side, said stem being spring-supported centrally on said frame, wings pivoted to the sides of said die, and means on said frame for engaging said wings and folding them upwardly on all sides operated by the downward movement of the plunger and die.

19. In a box making machine, the combination with a frame, and a vertically movable plunger operating therein, of a vertically movable die having a stem rigidly secured to its under side, a tube having a longitudinal slot in the wall thereof and depending from a portion of said frame and into which the said stem extends, a cushion spring within said tube beneath said stem, a threaded adjusting rod extending upwardly through the lower end of said tube and having a lock thereon connected to said die stem, a stud secured to said stem and extending outwardly therefrom through said slot, wings pivotally secured to the sides of said die, and means secured to the frame for folding said wings upwardly on the downward movement of said plunger.

20. In a box making machine, the combination with a vertically movable die, and a vertically movable plunger registering with said die, of a primary wing hinged on each side of said die, a secondary wing hinged to each of said primary wings at the outer end thereof, fixed means on said frame for engaging opposing primary wings on the initial downward movement of said plunger, movable members on said frame for engaging the other primary wings on the further movement of said plunger, said fixed and movable means next engaging said secondary wings to successively operate the same, and means movable with said plunger for engaging with and completing the movements of said secondary wings.

21. In a box making machine, the combination with a reciprocating die, and a plunger registering with said die, of a primary wing hinged to said die on each side thereof, a secondary wing hinged to the outer edge of each of said primary wings, a pair of closer jaws pivoted intermediate their length in said frame and having their upper sections spring-held to a lower portion of said frame and their lower sections extending below said die, and means carried by said plunger for pressing in said secondary wings.

22. In a box making machine, the combination with a vertically movable die, and a vertically movable plunger registering with said die, of a pair of wings hinged to opposing sides of said die, a pair of closer jaws pivoted intermediate their length in said frame and having their upper ends spring-held to a lower portion of the frame and their lower ends extending under said die, a pair of wings hinged to the remaining opposing sides of said die, and a pair of rigid closer jaws secured to said frame adapted to engage said latter wings on the downward movement of the die previous to the engagement of the said pivoted closer jaws.

23. In a box making machine, the combination with a vertically movable die, and a vertically movable plunger registering with said die, of a pair of primary wings hinged to opposing sides of said die, a pair of rigid closer jaws secured to the frame of the machine and engaging said wings on the downward movement of said die, a pair of primary wings hinged to the remaining opposing sides of said die, a pair of closer jaws pivoted and spring-held and operated by the downward movement of said die and following the operation of said rigid jaws, a secondary wing hinged to the outer edge of each of the primary wings and adapted to be thrown inwardly by said closer jaws, and presser arms rigidly secured to said plunger and engaging said secondary wings.

24. In a device of the class described, in combination, a main frame, a reciprocating die supported therein, folding wings hinged to said die, rigid closer jaws secured to said main frame and engaging the outer surfaces of opposing wings, movable closer jaws engaging the outer surface of the remaining opposing wings, a plunger frame reciprocating in said main frame, a vertically movable plunger registering with said die, members depending from said plunger frame, presser plates secured to said members and extending in the downward movement of the plunger over the outer surfaces of the wings folding inside the box, adjustable enveloping pieces hinged to depending arms and engaging said movable closer jaws on their outer upper surfaces on the downward movement of the plunger, and means for reciprocating said plunger frame.

25. In a device of the class described, in combination, a main frame, a die reciprocating within said frame, folding wings secured to said die, rigid closer jaws adjustably secured to said frame, movable closer jaws adjustably secured to said frame, a plunger frame reciprocating in said main frame, a plunger, a pair of members depending from the top pieces of said plunger frame and yieldably arranged thereon, a pair of arms depending from the remaining top piece of said frame and adjustably arranged thereon, presser plates adjustably secured to said members, enveloping pieces adjustably arranged on the said pair of adjustable members, and means for reciprocating said plunger frame in the main frame.

26. In a device of the class described, in combination, a main frame having upwardly extending tube portions, cushion springs located in said tube portions, a die reciprocating within said frame, folding wings secured to said die, means secured to said frame for closing said wings, a plunger frame having downwardly depending rods telescopically arranged in said tubes, a plunger, and means for reciprocating said plunger frame.

27. In a device of the class described, in combination, a main frame having upwardly extending hollow members, cushion springs located in said members, a die reciprocating within said frame, folding wings secured to said die, means secured to said frame for folding said wings, a plunger frame having downwardly depending rods telescopically arranged in said hollow members, a collar having lugs encircling each of said hollow members at their upper ends, a pair of rollers journaled on said collars and contacting with said depending rods, a plunger adjustably arranged in said plunger frame, and means for reciprocating said rods in said hollow members and causing said plunger to register with said die.

28. In a device of the class described, in combination, a main frame, a die reciprocating in said frame, a plunger frame reciprocating in said main frame, a plunger carried by said plunger frame, and means intermediate said plunger and plunger frame for causing said plunger to yield automatically in its frame when depressed and resisted by a predetermined pressure.

29. In a device of the class described, in combination, a main frame, a die reciprocating in said frame, a plunger frame, a plunger carried by said plunger frame, means intermediate said plunger and plunger frame for causing said plunger to yield automatically and abruptly when depressed, and means for adjusting said yielding means to vary its release.

30. In a device of the class described, in combination, a main frame, a die reciprocating within said frame, a reciprocating plunger adapted to engage and move said die, and means for adjusting said die and plunger laterally with respect to each other and for maintaining said parts in their adjusted position.

31. In a device of the class described, in combination, a main frame, a die reciprocating within said frame, a reciprocating plunger adapted to engage and move said die, and means for adjusting said plunger laterally with respect to said die and for clamping the same.

32. In a device of the class described, in combination, a main frame, a die reciprocating in said frame, a reciprocating plunger frame, a plunger carried by said frame and adapted to engage and move said die, a ball and socket connection between said plunger and plunger frame for adjusting said plunger with respect to said die, and means for clamping said ball and socket joint.

33. In a device of the class described, in combination, a main frame, a removable folding die reciprocating in said frame, laterally adjustable means on said frame for folding said die, a removable plunger adapted to engage and move said die, a plunger frame carrying said plunger, and laterally adjustable operating parts carried by said plunger frame and adapted to engage the folding parts of said die.

34. In a device of the class described, in combination, a main frame, a removable folding blank receiving die reciprocating in said frame, laterally adjustable means on said frame for folding said die, laterally adjustable tucking fingers on said frame for folding the corners of the blank, a removable plunger adapted to engage and move said die, a plunger frame carrying said plunger, and laterally adjustable operating parts carried by said plunger frame and adapted to engage the folding parts of said die.

35. In a device of the class described, in combination, a main frame, a blank receiving die supported in said frame, a reciprocating plunger adapted in conjunction with said die to form said blank on said plunger and having an orifice therethrough, an air compressing cylinder independently supported on said main frame and operated by the reciprocating of said plunger, an air conveying connection between said cylinder and the orifice in said plunger, and means for reciprocating said cylinder.

36. In a device of the class described, in combination, a main frame, a die supported in said frame, a reciprocating plunger frame supported on the main frame, and having an upward projection therefrom, a plunger carried by said plunger frame and having an orifice therethrough, a cylinder independently supported from said main frame and having a port toward the upper end thereof, a piston traveling in said cylinder, a rod extending therefrom through the lower head of said cylinder and having a nut at its lower end in proximity to said upper projection from the frame and engaged thereby, a spiral spring encircling said rod and retaining it normally in its lowermost position, a flexible tube connecting said port and said orifice in the plunger, and means for reciprocating said plunger.

37. In a device of the class described, in combination, a main frame, a plunger movable in said main frame, a die movable in said main frame and adapted to be depressed by said plunger, and means for operating said plunger, said means, when released, returning both said plunger and said die to their initial positions.

38. In a device of the class described, in combination, a main frame, a plunger movable in said main frame, a die movable in said main frame and adapted to be depressed by said plunger, a lever pivoted in said main frame and connected with said plunger to depress the same, means for retracting said plunger and lever, and connections between said die and lever for retracting said die with said lever.

39. In a device of the class described, in combination, a main frame having upwardly projecting members, a plunger frame supported on said upwardly projecting members, a plunger carried by said plunger frame, a die supported within said main frame, an operating lever pivoted in said main frame, and means for connecting said pivoted lever with said plunger frame to operate the latter.

40. In a device of the class described, in combination, a main frame having upwardly projecting hollow members, a plunger frame having downwardly extending rods traveling in said hollow members, a die supported within said main frame, a lever pivoted on said main frame, a pair of rods extending upwardly through said hollow members and connected to said plunger frame rods, a cross-bar joining said pair of rods, a connecting rod to said lever, and a plunger secured to said plunger frame.

41. In a device of the class described, in combination, a main frame having a pair of upwardly extending hollow members, a die supported within said frame, cushion springs introduced in said hollow members, a plunger frame having a pair of rods traveling in said hollow members, said rods cushioning on said cushion springs and having reduced lower portions extending through said springs and said hollow members, a cross-bar joining said lower extensions beneath said hollow members, a treadle pivoted to said main frame, a connecting rod from said treadle to said cross-bar, and a plunger on said plunger frame.

42. In a box making machine, the combination with a plunger, of a die, and means on said die operated by the movement of said plunger for completely folding a blank on said die into a flanged article.

43. In a box making machine, the combination with a plunger, of a movable die, and means on said die operated by the movement of said plunger and die for completely folding a blank on said die into a flanged article.

44. In a box making machine, the combination with a plunger, of a die, and means on said die for completely folding a blank on said die into a flanged article at a single operation of said plunger.

45. In a box making machine, a plunger, a movable folding die, and means operated by the movement of said plunger and die for folding said die and for folding a blank into a flanged article on said die.

46. In a box making machine, a plunger, a folding die, and means operated by the movement of said plunger for folding said die and for folding a blank into a flanged article on said die.

47. In a box making machine, the combination with a plunger, of a movable die, wings hinged to the sides of said die in such manner as to fold onto said die when moved to their folded position to form a blank into a flanged article, and means operated by the movement of said plunger and die for folding said die wings on the downward movement of said plunger.

48. In a box making machine, the combination with a vertically movable plunger, of a vertically movable blank receiving die, wings hinged at their outside edges to said die and adapted, when folded, to overlap said die surface to form a blank into a flanged article, and means operated by the movement of said plunger and die for folding said die wings on the downward movement of said plunger.

In testimony whereof, I have hereunto set my hand in the presence of two subscribing witnesses.

WILLIAM RIGHTER COMINGS.

Witnesses:
M. MURPHY,
ANNA B. A. WOOD.